Patented Sept. 9, 1947

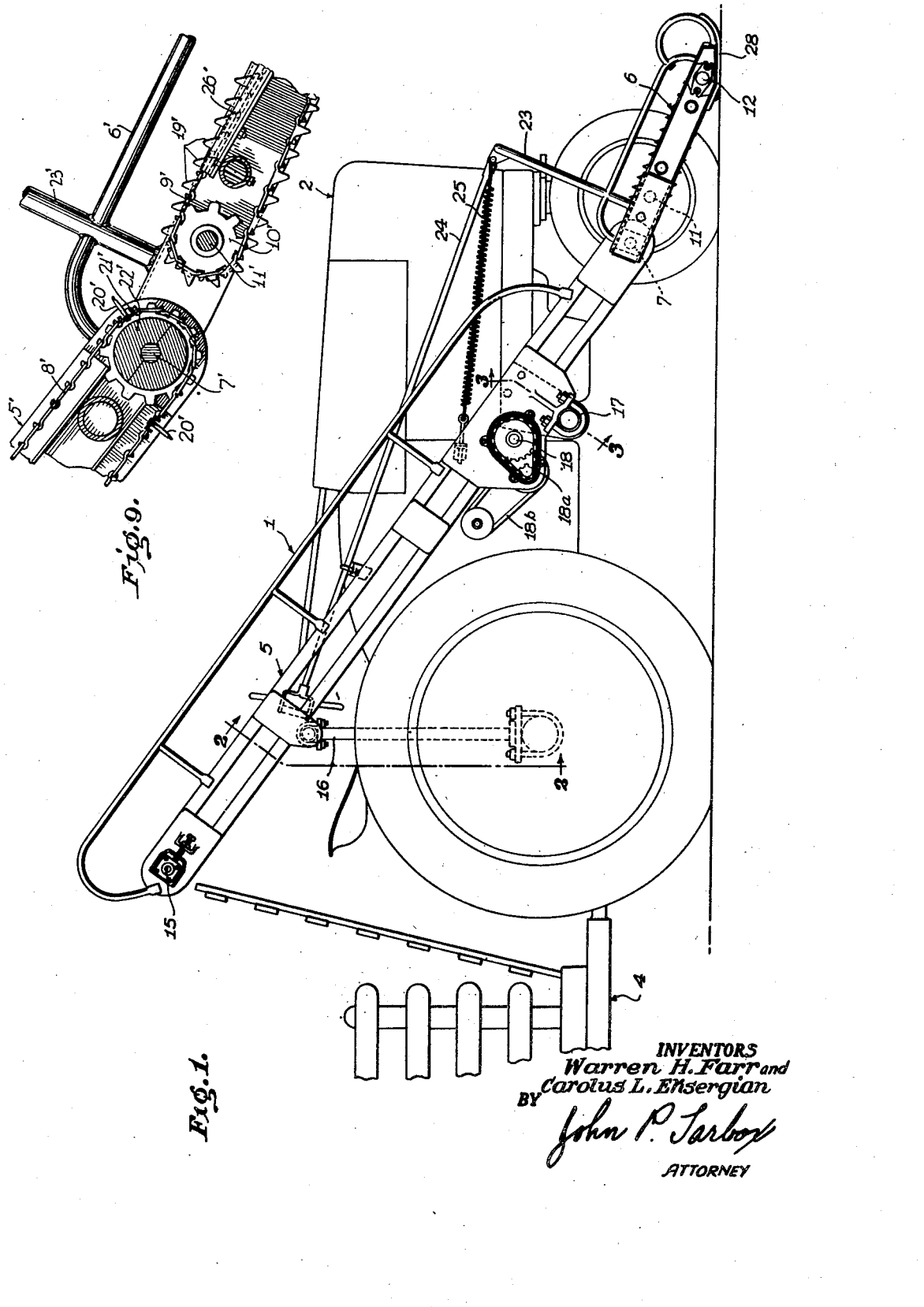

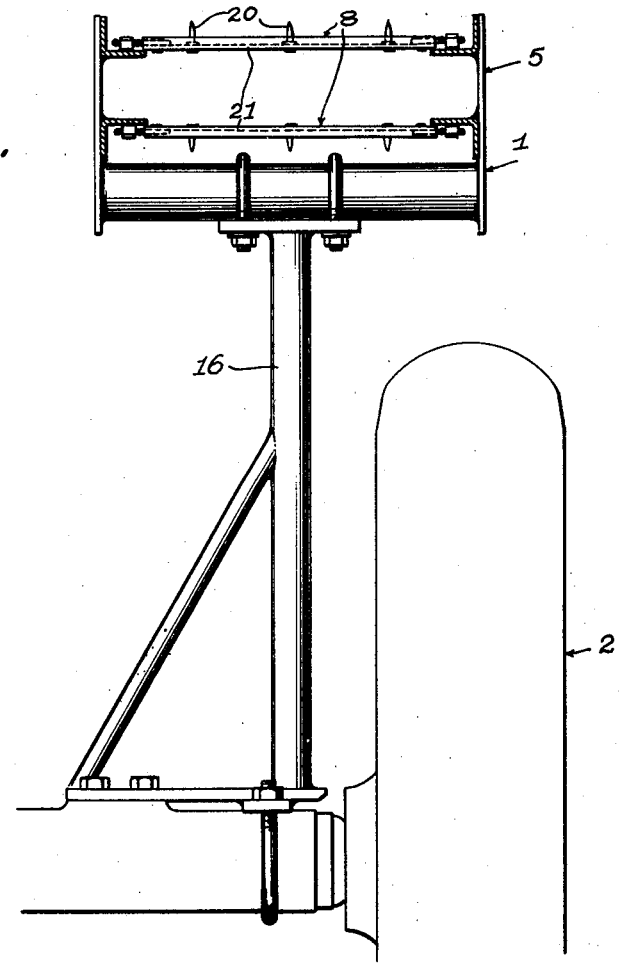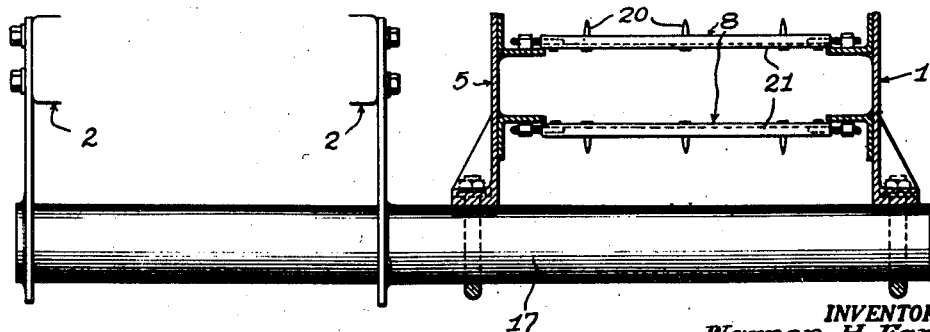

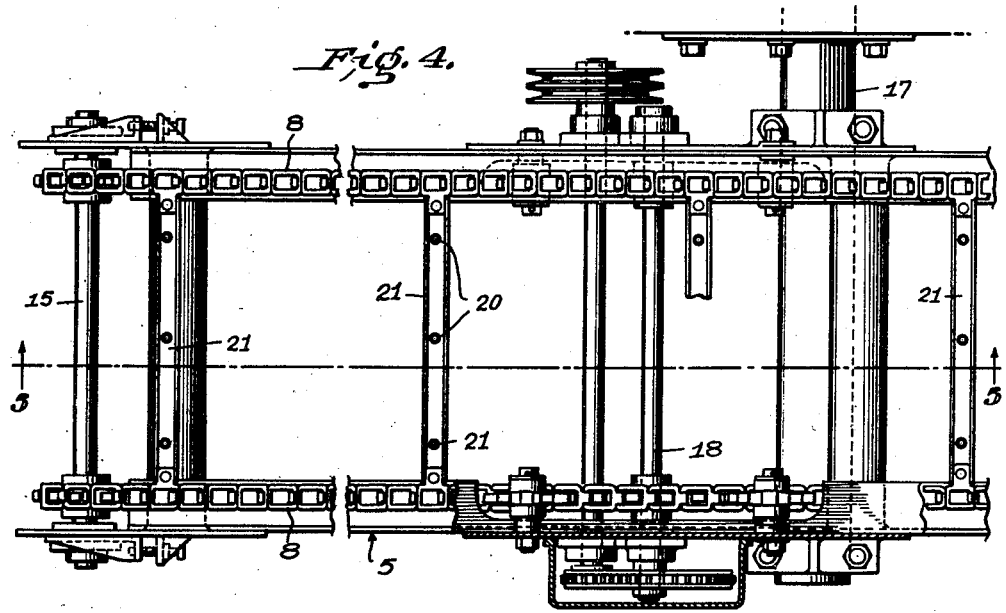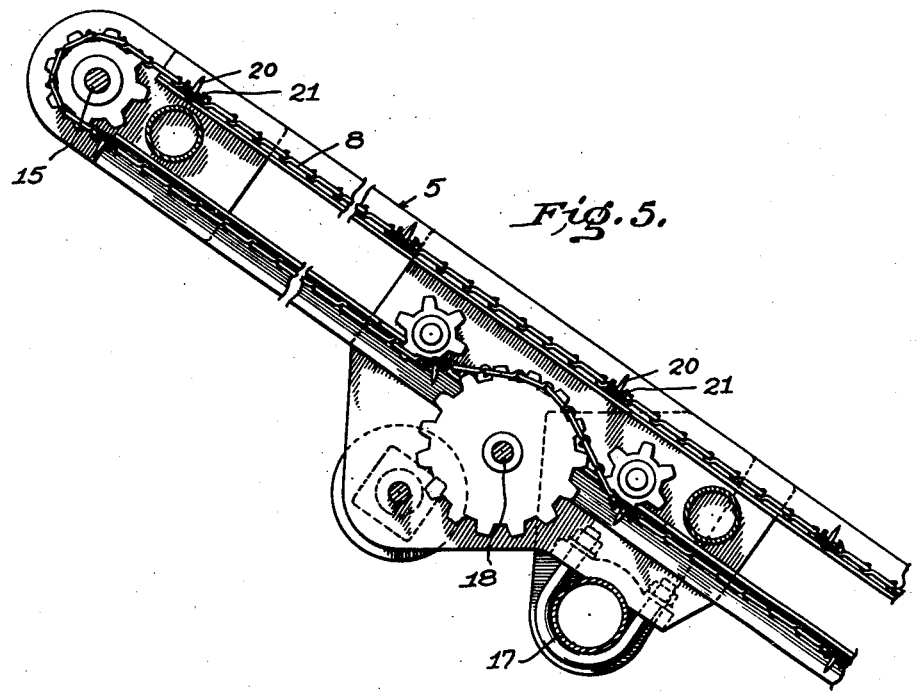

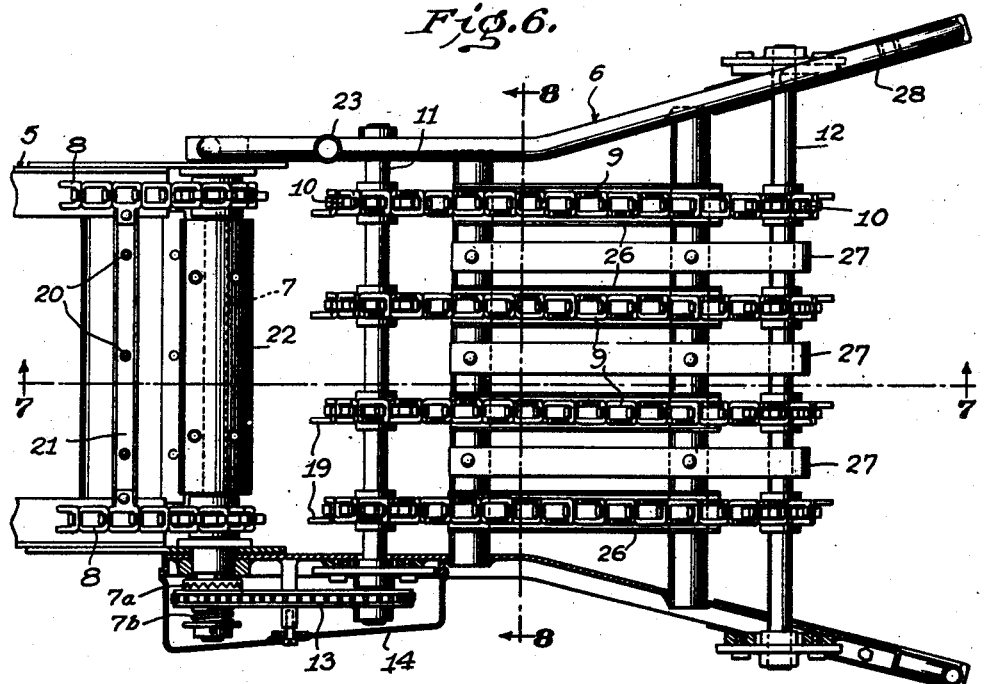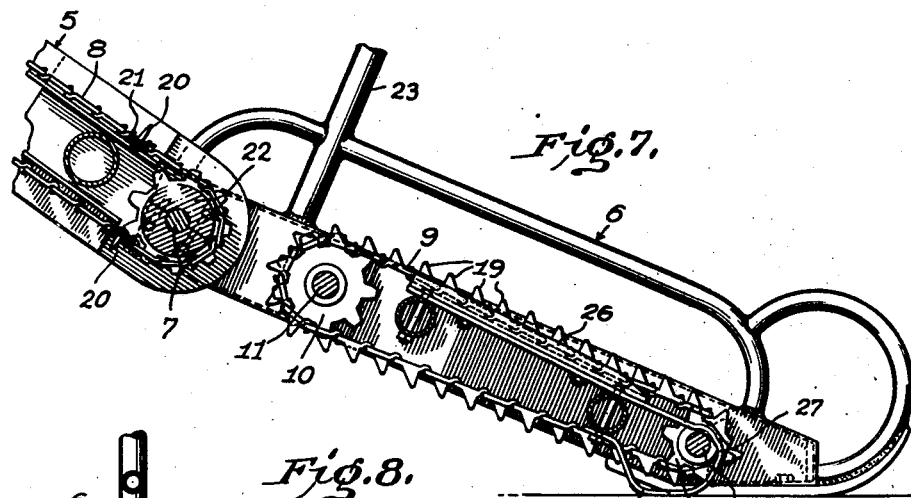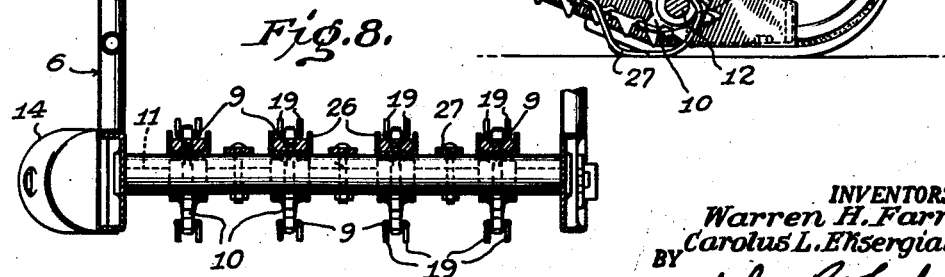

2,427,324

UNITED STATES PATENT OFFICE 2,427,324

CONVEYOR LOADER

Warren H. Farr, Grosse Pointe Farms, and Carolus L. Eksergian, Detroit, Mich., assignors to The Budd Company, Philadelphia, Pa., a corporation of Pennsylvania Application October 26, 1944, Serial No. 560,447

3 Claims. (Cl. 198—8)

The invention relates to conveyor loaders, particularly to travelling bale loaders, and has for an object the provision of improvements in this art.

One of the particular objects of the invention is to provide a travelling loader which will not push the bale or other article to be loaded ahead of it nor drag the bale rearwardly along the ground.

Another object is to provide a loader which will not cut or mill the bale as it is engaged.

Another object is to provide a loader which will readily release the bale, as upon delivery to a subsequent conveyor.

Another object is to provide a loader which will readily ride over obstacles in any part of its width but without requiring projections in front of the conveyor pick-up elements.

Another object is to provide protection of the pick-up elements from the ground in normal operation.

The above and other objects will be apparent from the following description of an exemplary embodiment of the invention, reference being made to the accompanying drawings, wherein:

Figure 1 is a side elevation of the loader and associated tractor and trailer;

Figure 2 is an enlarged vertical section taken on the line 2—2 of Figure 1;

Figure 3 is an enlarged vertical section taken on the line 3—3 of Figure 1;

Figure 4 is an enlarged top plan view of the upper end of the upper conveyor section, parts being broken away and other parts omitted;

Figure 5 is a vertical section taken on the line 5—5 of Figure 4;

Figure 6 is an enlarged plan view of the lower end of the conveyor;

Figure 7 is a vertical section taken on the line 7—7 of Figure 6;

Figure 8 is a transverse vertical section taken on the line 8—8 of Figure 6; and Figure 9 is a partial view similar to Fig. 7 showing a slightly modified form.

Referring to the drawings, the conveyor loader 1 is suitably mounted and driven, as for example, upon and by a tractor 2. The bales of hay, straw or the like, may be loaded into a vehicle such as a trailer 4 which is hitched to the tractor.

The loader comprises an upper conveyor section 5 of considerable inclination and a lower conveyor section 6 which is more nearly horizontal. The lower section is hinged to the upper section on the axis of the lower sprocket shaft 7 of the conveyor belt 8 of the upper section.

The conveyor belt 9 of the lower section, which includes a plurality of chain belts mounted on sprockets 10, operates upon spaced shafts 11, 12. The upper shaft 11 of the lower section is driven by a chain 13 from the shaft 7, the chain and its sprockets being enclosed by a casing 14. A safety slip drive, including toothed members 7a (Fig. 6) and a spring 7b, is provided on the shaft 7.

The conveyor belt 8 of the upper section at its upper end is carried around sprockets on a shaft 15.

The frame of the upper section is mounted on brackets 16, 17, carried from suitable anchorages on the tractor and the conveyor belt 8 of the upper section on its lower reach passes over and is driven by sprockets on a drive shaft 18. The shaft 18 is connected by suitable gearing, here shown as a chain belt 18a (Fig. 1) and V-belts 18b, with the power take-off of the tractor. These power take-offs are common to many tractors but may be differently located and geared for different tractors and adaptation must be made for this.

Preferably the gearing is such that the conveyor of the lower section will run at the same speed as that at which the tractor moves forward so that the end of the bale first engaged will be lifted upon the conveyor and thereafter the conveyor will be moved beneath the bale without moving the other end of the bale relative to the ground. This provides that the bale will not be pushed forward along the ground with the possibility of being broken open against an obstruction nor will it be snatched up too quickly with the possibility of being cut by the conveyor projections.

The projections 19 of the lower conveyor belt 9 are especially designed to engage the bale securely but without getting caught in the bale. If projections are of such shape as to be caught they will not properly release the bale at the upper end of the section and may tear the bale and sometimes break it apart. It is to be noted that bales are frequently bound with twine which is more easily cut than the wire binding formerly used. The projections are triangular with the less steeply inclined edge (relative to the line of travel) on the trailing side. The ends are somewhat pointed but not sharp, being rounded on a small arc. They are quite numerous, and there being a number of conveyor belts or chains, there will be many projections to engage a bale.

Projections 20 on cross-bars 21 of the conveyor of the upper section are longer and thinner than the projections 19, somewhat like spikes, and lift the end of the bale as they come under it. They also hold the bale securely as it travels up the steep incline of the upper section.

There is a space between the belt of the lower section and the belt of the upper section and if the end of the bale should drop down it might be wedged against parts of the upper section. To prevent this, a large drum 22 is placed upon the lower shaft 7 of the upper section.

The lower section is provided with an operating arm 23 adapted to be controlled by a rod 24 from the tractor to raise or lower the section. A spring 25 partly or wholly balances the conveyor section making it easier to move up and down. Preferably the tension of the spring and the friction of parts are so chosen that the lower end of the pick-up conveyor section will remain where it is moved by any obstructions. When the teeth of the lower conveyor belt engage the end of the bale they pull the end of the conveyor down until it touches the ground, lifts the bale and pushes under it.

The chain belts of the lower section operate in channel ways 26 so as to evenly support the bale on its way up. To prevent the lower span of the lower section from touching the ground a shoe guard 27 is provided between each two chain belts. There are also side guards 28. The guards 27 do not extend forward as far as do the projections of the chain belts but the side guards 28 extend well forward to receive and orient the bales.

The modification shown in Fig. 9 is the same in principle as that shown in Fig. 7 but has a larger drum and sprockets at the lower end of the upper conveyor section to cause the bale to ride in a straight line from the lower conveyor belt until picked up by a cross bar. Also the teeth of the upper conveyor are made longer to give the bale a pronounced lift to raise its front end from the teeth of the lower section. The parts are designated by the same reference numeral as in Fig. 7 but with a prime (') added.

It is thus seen that the invention provides very practical and inexpensive apparatus for lifting material, particularly such material as baled hay; that obstruction to the operation or damage to the bales is greatly reduced; and that the apparatus is very convenient to operate.

While one embodiment of the invention has been described it is to be understood that there may be various embodiments within the limits of the prior art and the scope of the subjoined claims.

What is claimed is:

1. A conveyor loader adapted to load material such as bales of hay and the like, comprising in combination, a conveyor which is disposed near the ground at its front end, means to move the conveyor forward, a plurality of laterally spaced conveyor belts on the conveyor adapted to move backward on the upper reach, the conveyor belts having short pick-up projections thereon, means supporting the front end of the conveyor belts near the ground, and guards disposed between adjacent conveyor belts holding the lower span of the conveyor belts off the ground and extending upward at the front end alongside the path of movement of the projections but at the front end being disposed behind the extreme forward end of the path of the projections as they move around the front end of the conveyor, whereby when the conveyor moves forward the object is first engaged by the projection.

2. A conveyor loader adapted to load material such as bales of hay and the like, comprising in combination, a pick-up conveyor having its front end positioned near the ground, means to move the conveyor forward, a belt on the conveyor moving backward on its upper reach, and a plurality of projections secured to said belt along its length for engaging the material to be loaded, the projections being thin plates of triangular shape in the plane of their path of movement with the belt.

3. A conveyor loader adapted to load material such as bales of hay and the like, comprising in combination, a pick-up conveyor having its front end positioned near the ground, means to move the conveyor forward, a conveyor belt on the conveyor moving backward on its upper reach, and a plurality of projections secured to said belt along its length for engaging the material to be loaded, the projections being thin plates of triangular shape in the plane of their path of movement with the belt, said triangular projections being relatively steeply inclined on their forward side and relatively much less inclined on their trailing side with reference to the direction of movement of the belt.

WARREN H. FARR.
CAROLUS L. EKSERGIAN.

REFERENCES CITED

The following references are of record in the file of this patent:

UNITED STATES PATENTS

| Number | Name | Date |
|---|---|---|
| 865,446 | Stewart | Sept. 10, 1907 |
| 1,100,414 | Ashe | June 16, 1914 |
| 1,136,264 | Pitcher | Apr. 20, 1915 |
| 1,142,197 | Murphy | June 8, 1915 |
| 1,273,312 | Baum | July 23, 1918 |
| 1,392,069 | McDermott | Sept. 27, 1921 |
| 1,556,549 | Ronning | Oct. 6, 1925 |
| 1,726,065 | Greenleaf | Aug. 27, 1929 |
| 1,753,246 | Newdick | Apr. 8, 1930 |
| 1,853,253 | Bennett | Apr. 12, 1932 |
| 1,888,868 | Shroder | Nov. 22, 1932 |
| 2,370,248 | Kent | Feb. 27, 1945 |